United States Patent [19]

Young et al.

[11] Patent Number: 5,037,518
[45] Date of Patent: Aug. 6, 1991

[54] APPARATUS AND METHOD FOR GENERATING HYDROGEN AND OXYGEN BY ELECTROLYTIC DISSOCIATION OF WATER

[75] Inventors: Stuart A. Young, Elmhurst; Ronald A. Zweifel, LaGrange; Daniel L. Caldwell, Downers Grove, all of Ill.

[73] Assignee: Packard Instrument Company, Downers Grove, Ill.

[21] Appl. No.: 405,633

[22] Filed: Sep. 8, 1989

[51] Int. Cl.$^5$ .......................... C25B 9/00; C25B 15/02
[52] U.S. Cl. ..................................... 204/230; 204/228; 204/229; 204/263; 204/266; 204/129
[58] Field of Search ............... 204/242, 129, 275, 278, 204/228, 229, 230, 266, 263; 423/648.1; 123/1 A, 3, DIG. 12

[56] References Cited

U.S. PATENT DOCUMENTS

| | | | |
|---|---|---|---|
| 3,489,670 | 7/1964 | Maget | 136/86 |
| 3,870,616 | 3/1975 | Dempsey et al. | 204/230 |
| 3,992,271 | 11/1976 | Danzig et al. | 204/129 |
| 4,369,737 | 1/1983 | Sanders et al. | 123/3 |
| 4,424,105 | 1/1984 | Hanson | 204/228 |
| 4,705,543 | 11/1987 | Kertzman | 55/158 |
| 4,808,292 | 2/1989 | Kessler et al. | 204/403 |
| 4,822,469 | 4/1989 | Shimomura | 204/230 |

FOREIGN PATENT DOCUMENTS

| | | | |
|---|---|---|---|
| 0023168 | 1/1981 | European Pat. Off. | 204/275 |
| 1002406 | 3/1983 | U.S.S.R. | 204/129 |
| 2205858A | 12/1988 | United Kingdom | |

Primary Examiner—John F. Niebling
Assistant Examiner—Kathryn Gorgos
Attorney, Agent, or Firm—Arnold, White & Durkee

[57] ABSTRACT

Apparatus for generating hydrogen by the electrolysis of water comprising an electrolytic cell having a cathode and an anode separated by a solid electrolyte, an electrical power supply connected to the cell for applying a voltage across the cathode and anode, a water reservoir connected to the cell for supplying water to the anode side, a hydrogen-water separator connected to the cell for receiving hydrogen and water from the cathode side and separating the hydrogen from the water, and a water return line connecting the hydrogen-water separator to the water reservoir for returning water to the water reservoir whereby the water is recycled to the anode side. A float valve in the upper region of the hydrogen-water separator closes the hydrogen outlet in response to an increase in the water level in the separator to the level of the hydrogen outlet, to prevent water from entering the hydrogen outlet in the event of a malfunction. A pressure relief valve in the hydrogen-water separator discharges hydrogen from the separator to the atmosphere in response to an increase in the gas pressure in the separator beyond a predetermined level. A sensor in the water reservoir producing an electrical signal in response to a drop in the water level in the reservoir to a predetermined level, or in response to a predetermined change in the electrical conductivity of the water, and control circuitry responds to the electrical signal for interrupting the supply of electrical power to the cell.

8 Claims, 10 Drawing Sheets

APPARATUS AND METHOD FOR GENERATING HYDROGEN AND OXYGEN BY ELECTROLYTIC DISSOCIATION OF WATER

BACKGROUND OF THE INVENTION

1. Field of the Invention

The present invention relates to methods and apparatus for the generation of gases. More particularly, the present invention relates to methods and apparatus for the generation of hydrogen and oxygen by the electrolytic dissociation of water.

2. Description of the Prior Art

It is well known that a gas, such as oxygen, hydrogen or chlorine, may be generated by disassociating a chemical compound into its constituent elements. The prior art describes several devices which utilize electrolytic cells for disassociating such compounds and generating gas. Such electrolytic cells take a variety of forms, but generally include a catalytic anode, a catalytic cathode and an adjacent electrolyte which is in electrical contact with both the anode and the cathode. A d-c voltage is applied across the catalytic electrodes to drive the reaction.

When reactants contact an electrode, they are dissociated into their constituent ionic forms, and the evolved gas is collected. For example, if water is placed in contact with the anode, an oxidation reaction will occur, disassociating the water to produce hydrogen and oxygen ions. The hydrogen ions move to the cathode where a reduction reaction produces hydrogen molecules, and at the anode the oxygen ions combine to form molecular oxygen. Generally, the electrolyte is a solid polymeric ion-exchange membrane.

Gas generators employing electrolytic cells may be used in many applications in place of compressed gas stored in cylinders. Moreover, electrolytic cells make possible the manufacture of inexpensive, compact devices for producing gas at the point of use. An example of an electrolytic cell gas generator is described in Dempsey et al. U.S. Pat. No. 3,870,616, which describes a hydrogen generator having a main water tank supplying water to the anode of an electrolytic cell for dissociation. However, not all the water supplied to the anode is dissociated. In fact, the bulk of the water supplied to the anode is transported with the dissociated hydrogen ions across the ion-exchange membrane into the cathode chamber. Part of this water returns to the anode chamber by diffusion back across the ion-exchange membrane; however, when gas is being actively generated, the rate of protonic pumping by the hydrogen ions is much greater than the diffusion rate of the water back across the membrane so that eventually a build up of water takes place in a accumulator chamber disposed above the cathode chamber. Whenever the water in the accumulator chamber rises above a predetermined level, a solenoid valve is closed to shut off the water supply from the main tank to the anode chamber. Nevertheless, as long as there is an electrical current supplied to the electrolytic cell, the dissociation reaction continues. In order to continue the reaction, and the production of gas, water must be supplied to the anode. However, the only water supplied to the anode chamber comes from the diffusion of water from the cathode chamber back across the ion-exchange membrane. During this period, the dissociation of the water is rate limited by the rate of water diffusing lack across the membrane.

"Drying out" or "breaking down" the membrane is a phenomenon which occurs when the electrolytic cell's demand for water is greater than the supply. The dissociation of water is driven by the current supplied to the electrolytic cell. As the current is increased, the quantity of water dissociated is increased. However, if the supply of water at the anode is not great enough to satisfy the demand of the electrolytic cell, the water molecules which were incorporated into the structure of the membrane during the manufacturing process will become dissociated. This irreversibly "dries out" the membrane, breaking down the polymer structure. As a result the output of the cell is progressively reduced, and the cell eventually becomes inoperable. This phenomenon will also occur if the generator accidentally runs dry, or loses its water through a leak in the system, or if the solenoid valve remains closed indefinitely.

The water contained in an electrolytic cell gas generator can become contaminated with impurities, such as metals, salts, acids, bases, or other electrolytes. Impurities such as these are contained in ordinary tap water. Once entered into the system, these impurities or contaminants are absorbed directly into the ion-exchange membrane, thereby "poisoning" the membrane and reducing the amount of uncontaminated surface area remaining to transport ions. As a result, the output of the cell is progressively reduced until the cell ceases to function entirely. This can be a gradual process or, if the amount of contamination is great enough, the membrane can be poisoned in a matter of minutes. Because these contaminants are invisible to an operator and electrolytic gas cell generators presently cannot detect if contaminated water is present, the ion-exchange membranes of these systems can be destroyed by the errant addition of tap water or other impure water into the generator.

SUMMARY OF THE INVENTION

It is an object of the present invention to address one or more of the foregoing deficiencies in electrolytic gas generators by providing an improved electrolytic gas generator.

One particular object of the present invention is to provide an electrolytic hydrogen and oxygen generator which produces hydrogen and oxygen at rates greater than those attainable in presently available electrolytic hydrogen generators.

Another important object of the present invention is to provide an electrolytic gas generator which is constructed to provide a longer productive lifetime for the ion-exchange membrane.

A further important object of the present invention is to provide a electrolytic cell gas generator which includes various safety features which protect the electrolytic cell from damage due to massive leaks, through the errant addition of impure water, or due to the absence of water from the supply system.

A still further object of the present invention is to provide a electrolytic gas generator having a solid-polymer-electrolyte electrolysis unit wherein the solid-polymer-electrolyte is protected from drying out.

Other objects and advantages of the invention will be apparent from the following detailed description and the accompanying drawings.

In accordance with the present invention, the foregoing objectives are realized by providing an electrolytic hydrogen and oxygen generator comprising an electrolytic cell having a cathode and an anode separated by an electrolyte; an electrical power supply connected to the electrolytic cell for applying a voltage across the cathode and anode; a water reservoir connected to the electrolytic cell for supplying water to the anode side of the cell; a hydrogen-water separator connected to the electrolytic cell for receiving hydrogen and water from the cathode side of the cell and separating the hydrogen from the water; and a water return line connecting the hydrogen-water separator to the water reservoir for returning water from the separator to the water reservoir so that the water is recycled to the anode side of said electrolytic cell. In a preferred embodiment, the water reservoir includes a sensor for producing an electrical signal in response to a drop in the water level in the reservoir to a predetermined level or in response to a predetermined change in the electrical conductivity of the water in the reservoir, and control means responsive to the electrical signal from the sensor for interrupting the supply of electrical power to the electrolytic cell. The preferred embodiment also includes a hydrogen output line for removing the hydrogen from the hydrogen-water separator, the hydrogen output line including a drying tube made of material which selectively adsorbs water vapor from gas flowing through the interior of the tube, and transfers the adsorbed water to the exterior of the tube.

Figure 1:
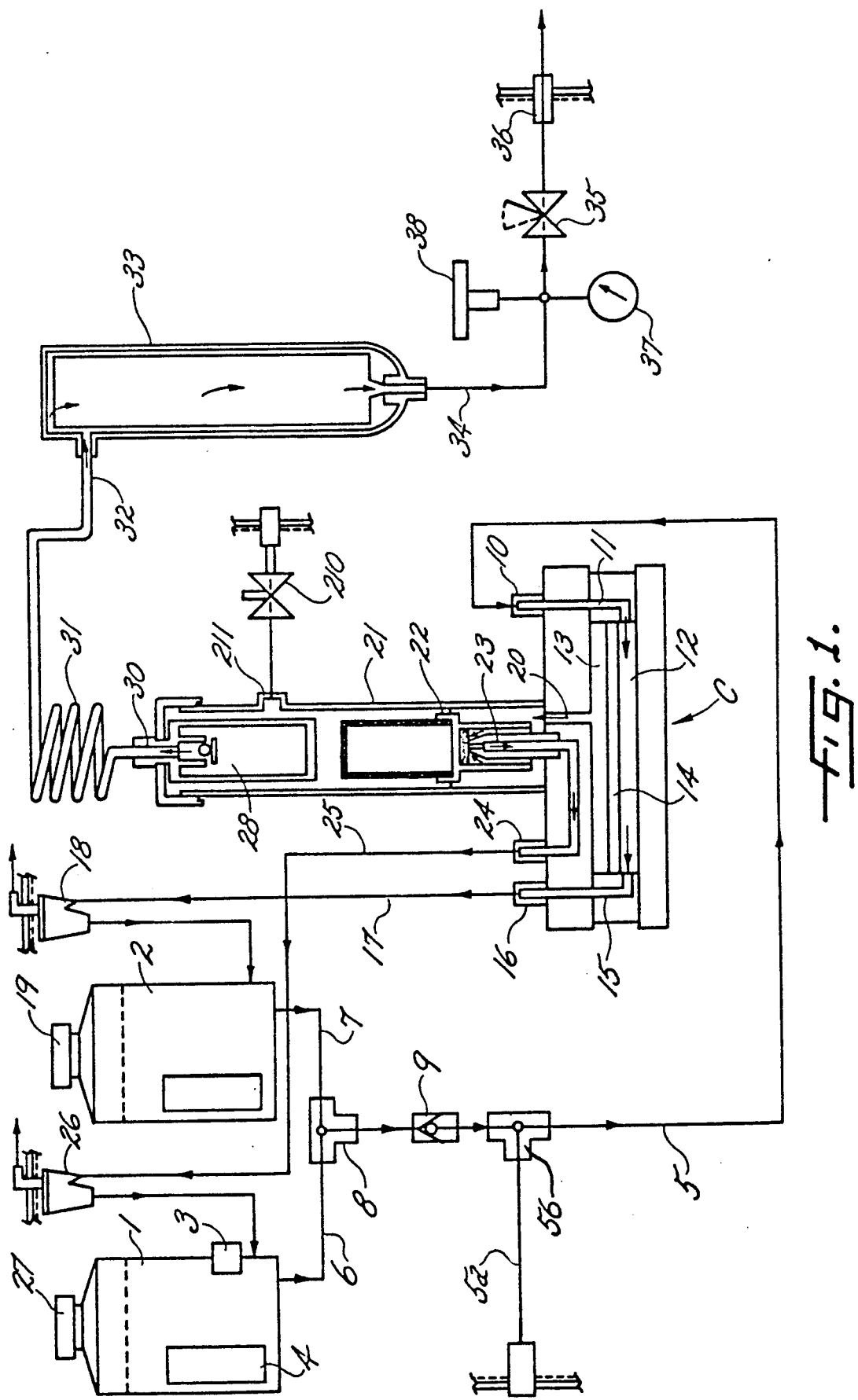
FIG. 1 is a schematic illustration of an electrolytic-cell hydrogen generator embodying the present invention.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Turning now to the drawings and referring first to FIG. 1, there is shown a gas generator which produces hydrogen and oxygen by the electrolysis of deionized, distilled water in an electrolytic cell C. Deionized, distilled water is the only liquid contained in the apparatus, and must be replenished as it is consumed. Gas generators of this type are intended for use in gas chromatography, flame ionization detectors, sulfur monitors, and other equipment requiring a source of pure hydrogen.

Deionized, distilled water for the electrolysis process is stored in reservoirs 1 and 2. The reservoir 1 includes a sensor 3 for simultaneously sensing both the presence and the purity of water in the reservoir, as will be described in more detail below. If the sensor 3 detects either an inadequate water supply or impure water, it produces a signal which automatically interrupts the supply of electrical power to the cell C. This prevents damage to the electrolytic cell because supplying electrical power to the cell without an adequate supply of water, causes dissociation of the water contained within the solid-electrolyte membrane in the cell. This irreversibly "dries out" the membrane, thereby destroying the membrane and requiring replacement. Similarly, if the electrolytic cell were allowed to run with an impure water supply, the membrane would soon become contaminated with impurities. Again this would destroy, and require replacement of, the membrane.

As an additional protective measure the reservoirs 1 and 2 may be provided with a deionizing agent sealed in a porous envelope or bag 4 to alleviate the problem of possible membrane contamination from small quantities of impurities, including metal ions generated in the closed-loop water system.

The reservoirs 1 and 2 are preferably positioned above the electrolytic cell C so that water flows into the cell by gravity. The water levels in the reservoirs remain virtually the same since they are connected in parallel to a common water supply line 5 to the cell. Thus, the water flows from the reservoirs 1 and 2 through respective lines 6 and 7 which converge at a Y connection 8 to the supply line 5. A check valve 9 is provided in the supply line 5 downstream of the connection 8 to prevent the back flow of water into the lines 6 and 7.

A drain line 5a is connected to the water supply line 5 via T connection 5b. This drain line 5a can be used not only to drain the system when desired, but also to connect the system to an auxiliary or larger water supply reservoir for applications where it is desired to have the unit operate continuously for periods longer than can be accommodated by the two reservoirs 1 and 2.

The water enters the water-tight housing of the electrolytic cell C through an inlet port 10. The inlet port 10 leads to an internal conduit 11 which conducts the water to an anode chamber 12, located directly beneath an ion-exchange membrane 14 which serves as the solid electrolyte for the cell. A cathode chamber 13 is formed directly above the membrane 14, and an electrical power supply (not shown in FIG. 1) is connected across the electrodes in the two chambers 12 and 13 so that the water is dissociated into ionic hydrogen and oxygen via electrolysis. The positively charged hydrogen ions are transported across the ion-exchange membrane 14 into the cathode chamber 13 along with water molecules. The negatively charged oxygen ions recombine at the anode to form molecular oxygen within the anode chamber 12.

The oxygen-enriched water exits the anode chamber 12 through an internal conduit 15 leading to an outlet port 16 which communicates with a return conduit 17 to return the oxygen-enriched water to the reservoir 2. The return conduit 17 includes an oxygen vent 18 which separates the oxygen gas from the water by venting the oxygen to the atmosphere. The reservoir 2 preferably includes a similar vent in its cap 19 which vents any oxygen remaining in the water that is returned to this reservoir.

Within the cathode chamber 13, the positively charged hydrogen ions combine to form molecular hydrogen. These hydrogen molecules, along with any water molecules transported across the membrane 14, flow out of the cathode chamber 13 through a conduit 20 into a hydrogen-water separator 21. The water remains at the bottom of the separator 21 where a float valve 22 opens to discharge water into a conduit 23 whenever the water rises above the desired level. This insures that the upper region of the separator 21 remains open for the collection of hydrogen gas. Thus, hydrogen diffuses from the water into the upper region of the separator 21 for collection and further processing.

The water conduit 23 returns the water therein to the reservoir 1 via outlet port 24, return line 25 and a hydrogen vent 26 which separates entrained hydrogen gas from the water by venting the hydrogen to the atmosphere. The cap 27 of the reservoir 1 preferably includes a similar vent which removes any remaining hydrogen from the water that is returned to this reservoir. Pressure for returning water from the separator 21 to the reservoir 1 is provided by the accumulated hydrogen in the separator, which forces water through the conduit 23 whenever the float valve 22 is open.

The hydrogen gas that accumulates in the separator 21 has a certain amount of water vapor entrained therein. This water vapor must be removed from the hydrogen because most uses for the hydrogen require pure hydrogen. Part of the water is removed from the hydrogen gas by passing the gas through a coalescing filter 28 in the upper region of the separator 21. As is well known, a coalescing filter forms a tortuous path which removes liquid droplets from a gas flowing therethrough.

In accordance with a further feature of this invention, the hydrogen is further dried by passing it through a drying tube made of a material which selectively adsorbs water vapor from gas flowing through the interior of the tube, and transfers the adsorbed water to the exterior of the tube. Thus, from the separator 21, the hydrogen passes upwardly through a conduit 30 to a drying coil 31 which removes a substantial portion of the water vapor from the hydrogen gas. The absorbed water then passe through the walls of the tubing and is evaporated from the outside surface of the tubing. Examples of suitable drying coils are described in more detail in U.S. Pat. Nos. 3,735,558 and 4,705,543. Other drying devices, such as a water trap for example, could be used in place of the drying tube.

From the drying coil 31, the hydrogen gas passes into a desiccator chamber 33 filled with a desiccant such as silica gel or a molecular sieve, either of which can be regenerated from time to time rather than being replaced. The partial drying of the hydrogen before it reaches the desiccator chamber 33 extends the intervals at which the desiccant must be regenerated. The gas flows downwardly through the desiccant and exits at the bottom of the chamber 33 through a tube 34.

The release of hydrogen gas from the unit is controlled by a shutoff valve 35 which connects the tube 34 to a hydrogen output port 36. A pressure gauge 37 monitors the hydrogen pressure in the conduit 34 and is mounted on the front panel of the generator to display the pressure reading to the user. A pressure transducer 38 also monitors the hydrogen pressure in the tube 34 and produces a corresponding electrical signal which is used to control the electrical power supplied to the electrolytic cell, as will be described in more detail below.

Figure 2:
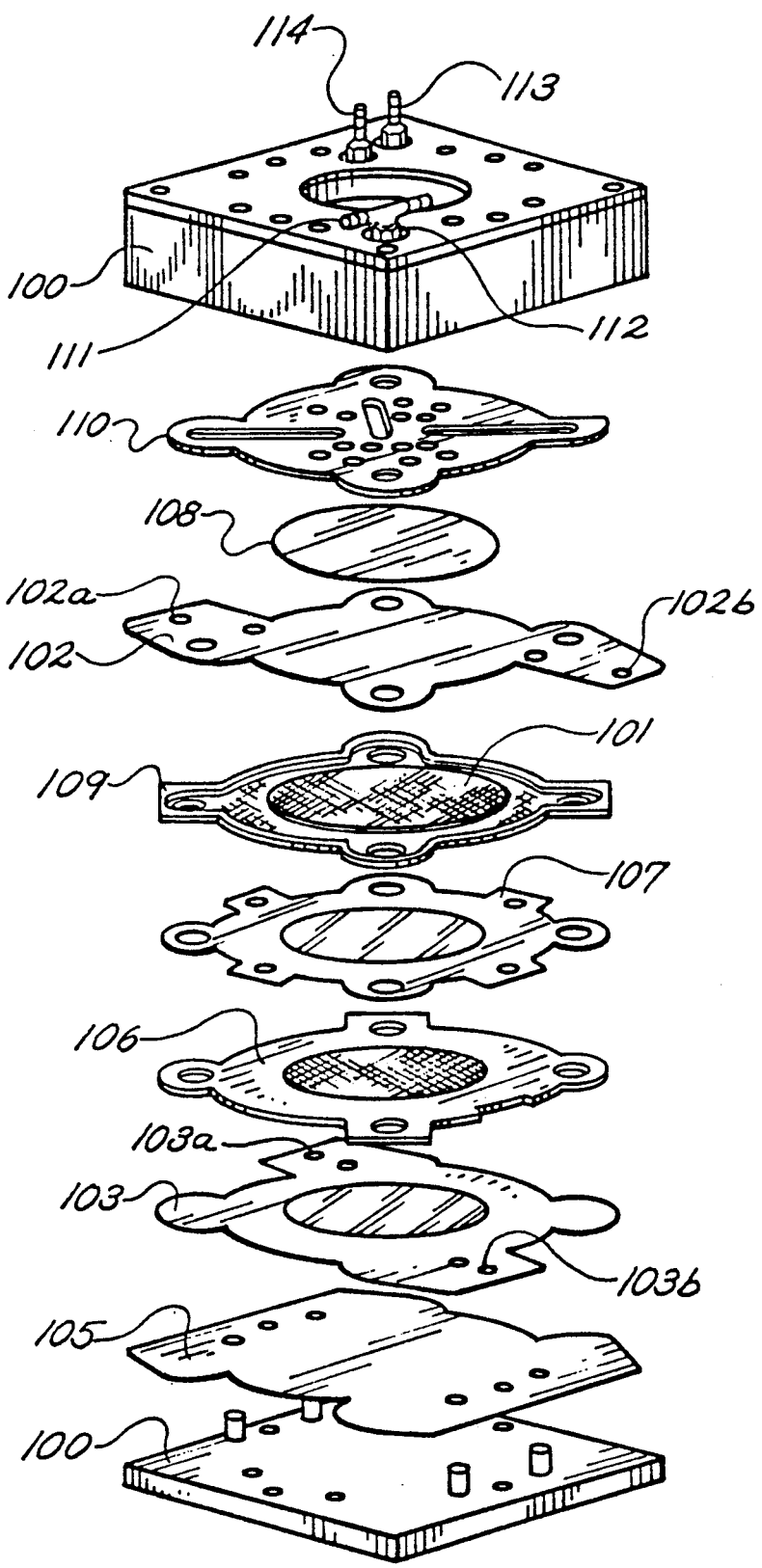
FIG. 2 is an exploded perspective of the electrolytic cell in the hydrogen generator of FIG. 1.

A preferred embodiment of the electrolytic cell of the present invention is shown in FIG. 2. This cell has a watertight housing 100 which clamps a solid polymeric ion-exchange membrane electrolyte 107 between a catalytic cathode 102 and a catalytic anode 103. These electrodes 102 and 103 preferably have a thickness of at least about 0.020 inch each. Electrical power is supplied to the cathode 102 through two attachment points 102a and 102b at opposite ends thereof, and the anode 103 receives electrical power through two similar attachment points 103a and 103b. The heat generated by resistance is directly related to the distance the current must travel through the resistor. The electrodes in electrolytic cells act as resistors, and thus, heat is generated as a current is passed through them. The heat generated in the electrodes of the present invention is substantially reduced by providing two electrical inputs for each electrode. Gaskets 106, 109 and 110 are provided to insure a water-tight construction for the electrolytic cell. In addition, a gasket 105 is provided between the anode 103 and the base of the housing 100 to electrically insulate the anode 103 from the base of the housing 100. This gasket 105 also has sufficient thermal conductivity to ensure good heat transfer from the electrodes into the housing 100, which serves as a heat sink. The housing 100 in turn is fastened to a metal chassis which also becomes part of the heat sink.

The two gaskets 106 and 109 are preferably laminates having a catalytic screen 101 disposed between two non-conductive annular gaskets. The screen is in electrical contact with the adjacent electrode and functions as a part of that electrode. To ensure that the screens firmly engage the respective electrodes, as well as the solid-electrolyte membrane 107, a pressure disc 108, of the same diameter as the screens, is disposed between the cathode 102 and the uppermost gasket 110 so that when the two housing sections are drawn together, the disc 108 exerts pressure on the screens. Water enters the cell housing 100 through a tee connection 111 connected to the housing by a stem 112, with the other end of the tee leading to a drain port. Water and oxygen are removed from the housing via an outlet 113, and water and hydrogen are removed from the separator 21 via an outlet 114 in the housing 100.

Although the invention has been illustrated with only one electrolytic cell, i.e., one pair of electrodes and one ion-exchange membrane, it will be understood that two or more cells may be stacked on top of each other in a single housing in order to increase the hydrogen-producing capacity of the unit.

Figure 3:
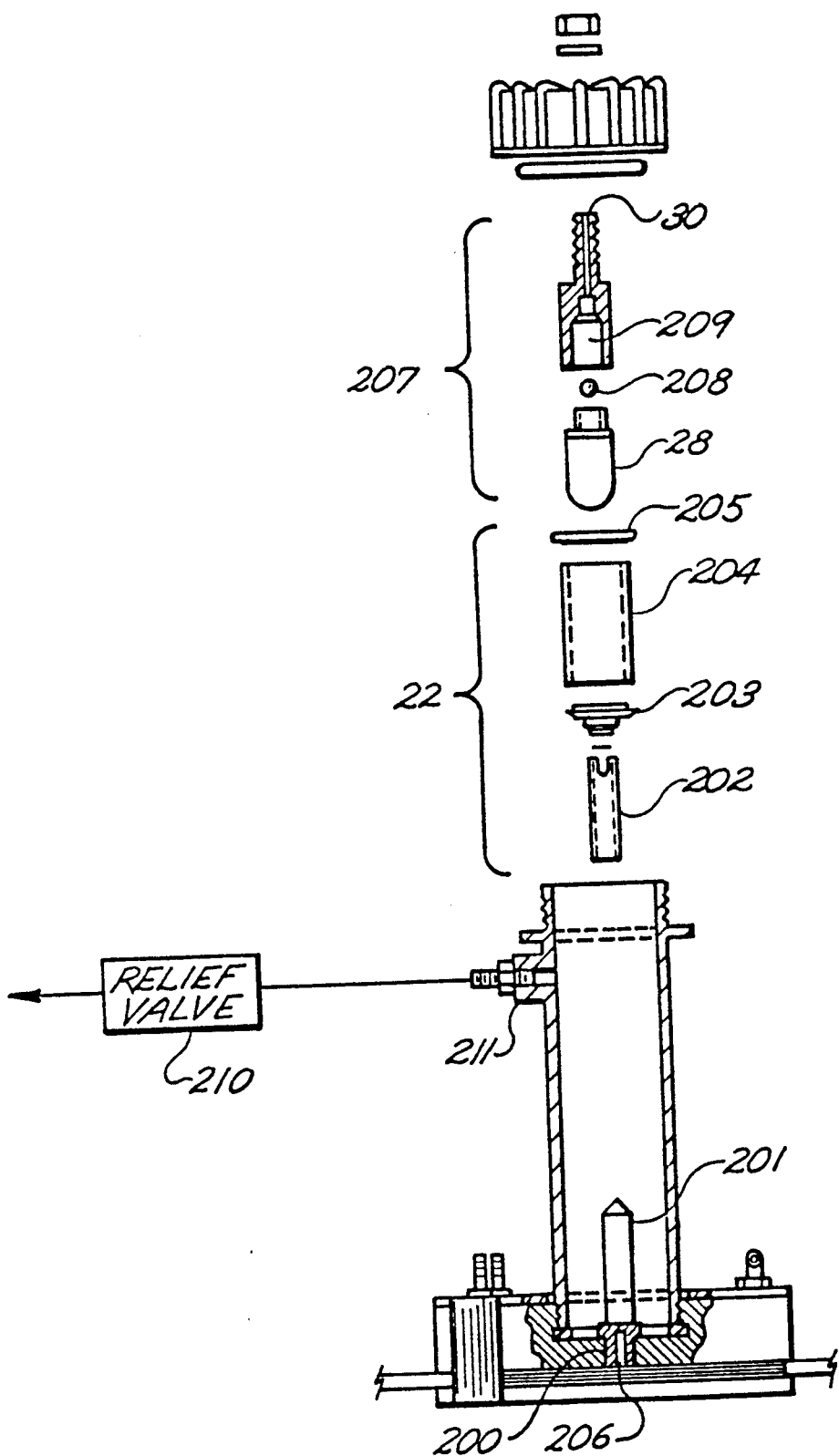
FIG. 3 is an exploded side elevation, partially in section, of the hydrogen-water separator in the generator of FIG. 1.

FIG. 3 illustrates a preferred embodiment of the hydrogen-water separator 21. The separator is constructed as an elongated, cylindrical vessel attached to the electrolytic cell housing and communicating with the cathode chamber of the electrolytic cell through the inlet port 20. Hydrogen-enriched water enters the separator through the inlet port 20, and the water level gradually rises around a hollow stem 201 fitted into the top of the housing 100. The float valve 22 cooperates with the stem 201 and is constructed from a tube 202 attached to a base 203 which in turn is attached to a hollow float valve body 204 sealed by a top 205. The tube 202 telescopes over the stem 201 having a central bore 206 extending along its axis. The tube 202 has two slots at its upper end to facilitate the flow of water between the main vessel of the separator 21 and the stem 201.

As the level of hydrogen-enriched water rises in the separator, the float assembly valve 22 lifts off the stem 201, thereby opening the top of the stem 201. Hydrogen-enriched water flows through the stem to a conduit within the top of the housing 100 and then on to the main reservoir 1, thereby lowering the water level in the separator 21. When the water level in the separator is sufficiently low, the float valve 22 seats on top of the stem 201, thereby closing the water return line to the reservoir 1.

If the float valve 22 should ever become inoperable, a ball valve 207 at the top of the separator chamber ensures that water never exits the separator 21 into the hydrogen conduit 30. If the water level should ever rise to the position of the ball valve 207, a ball 208 rises into a socket 209, sealing the outlet tube 30. The ball valve 207 protects the rest of the unit from contamination by liquid water, and also protects any sensitive equipment the operator may have connected to the hydrogen outlet port.

The hydrogen-water separator also includes a pressure relief valve 210 connected to a port 211 in the side wall of the main vessel of the separator 21. In the event that the pressure in the hydrogen collection becomes too great, the relief valve 210 will open, relieving the pressure. Accordingly, this valve prevents any accidental increase in pressure in the separator over acceptable limits which could damage the unit, any equipment connected to the unit, or the operator. The relief valve 210 is particularly important in view of the fact that the ball valve 207 can close the only other gas exit from the separator 21.

As discussed above, the ion-exchange membrane utilized in electrolytic cell gas generators is very delicate. For example, a sudden release of pressure in the separator can delaminate the membrane and render it inoperable. The float ball valve 207 included in the hydrogen gas collection chamber will prevent such a sudden loss of gas pressure in the unit. For example, if the outlet valve 35 were to be open to the outside atmosphere without resistance, hydrogen would rush out, rapidly reducing the pressure in the system. However, in the event of such an occurrence, the rapid flow of hydrogen past the ball 208 will lift the ball into the socket 209, sealing the outlet tube 30. This will prevent any damage to the ion-exchange membrane.

Figure 4:
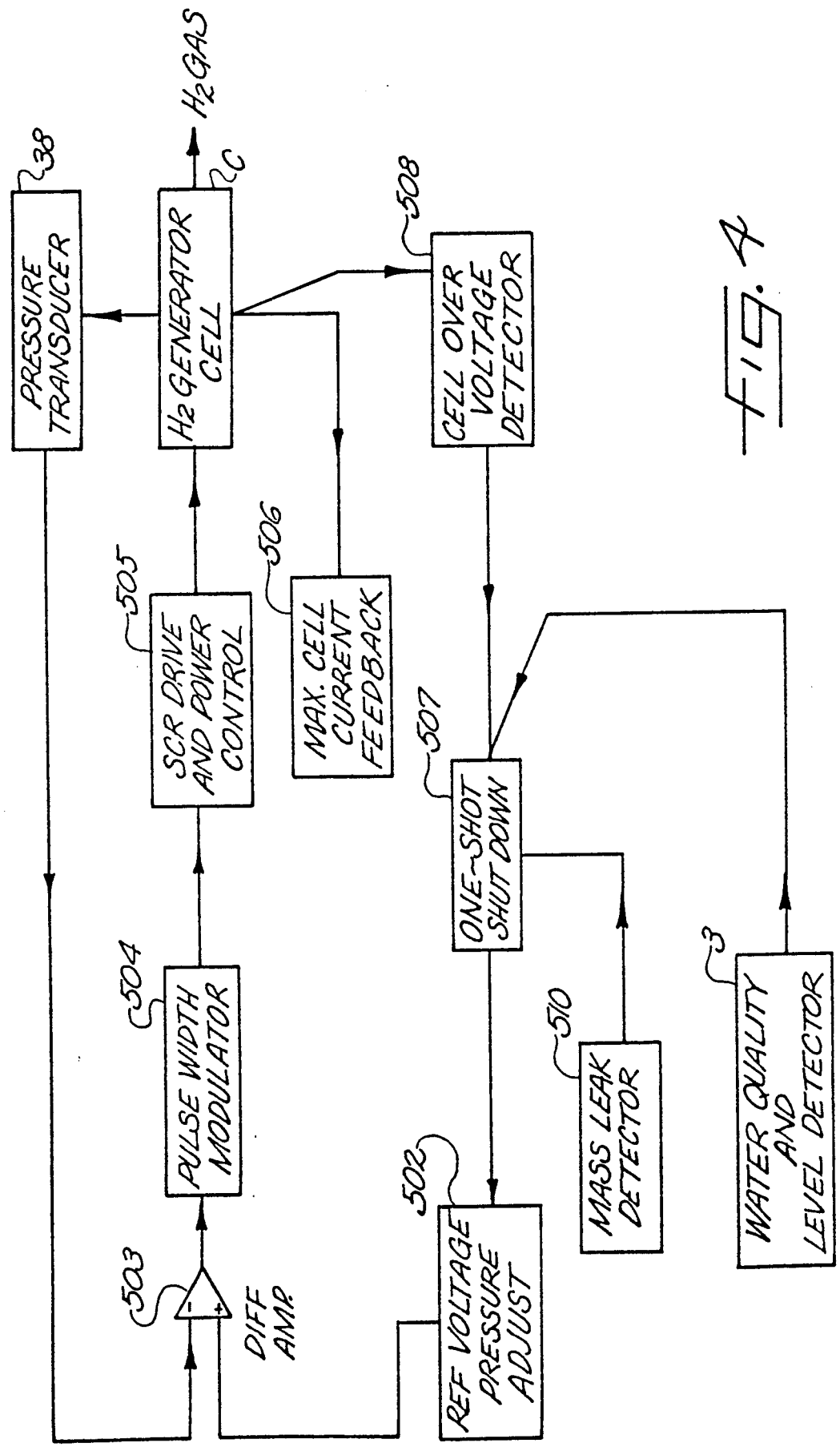
FIG. 4 is a block diagram of electrical circuits in the hydrogen generator.

Turning now to FIG. 4, there is shown a block diagram of the preferred electrical circuits in the hydrogen generator. To provide a selected pressure of hydrogen gas, the pressure of the hydrogen gas is measured with the pressure transducer 38, and the hydrogen generator cell C is supplied with an amount of electrical current that is regulated in response to the difference between the measured pressure and the desired pressure. The desired pressure is indicated by the reference voltage from the pressure adjust potentiometer 502, and a differential amplifier 503 compares the reference voltage to a pressure-indicating voltage from the pressure transducer 38 to provide a control signal for regulating the electrical current to the cell.

Instead of using the output pressure as the controlling parameter, the hydrogen flow rate in the hydrogen output line could be used as the controlling parameter. This would be desirable for certain applications where a controlled flow rate is more important than a controlled pressure. In this case, the pressure transducer 38 would be replaced with a flow rate sensor, such as by sensing differential pressures in the hydrogen output line.

The preferred method of regulating the current to the cell is pulse width modulation of signals gating a pair of silicon controlled rectifiers. Therefore, a pulse width modulator 504 is responsive to the control signal from the differential amplifier 503 and provides variable-width gate pulses to the SCR circuits 505. To limit the cell current to a safe value, the cell current is sensed by a threshold comparator 506 which provides a signal to inhibit the pulse width modulator 504 when a predetermined maximum cell current is reached.

To ensure that the hydrogen generator operates within guaranteed specifications, the current to the hydrogen-generating cell C is shut off entirely when certain conditions occur. The sensing of these conditions triggers a one-shot 507 that is reset only upon cycling a power switch "off" and then "on". In the usual case appropriate maintenance or servicing would be performed when the power switch is off before it is turned back on. For convenience of circuit design the one-shot shuts off the current to the hydrogen cell by driving the reference voltage from the potentiometer 502 to an extreme minimum value. Alternatively, the one-shot 507 could directly inhibit the SCR circuits 505.

Normally the voltage across the anode and cathode in the hydrogen generator cell C will not exceed a known maximum voltage. To shut off the hydrogen generator when the cell voltage exceeds the maximum voltage, a cell voltage threshold detector 508 supplies a shut-down signal to the one-shot 507.

To generate hydrogen gas and to avoid permanent damage to the solid electrolyte in the hydrogen generator cell C, the solid electrolyte should always be immersed in water. Also, to guarantee that pure hydrogen is generated and to avoid contamination of the solid electrolyte, the water must be deionized and should have a resistivity of at least a certain minimum value such as 100,000 ohm/cm. These conditions are insured by a water quality and level detector 509 that provides a shut-down signal to the one-shot 507 in the absence of a minimum level of high quality water in the hydrogen generator cell C.

When the hydrogen generator is unable to provide hydrogen gas at the desired pressure, a hydrogen leak might be the cause. Therefore, a mass leak detector 510 provides a shutdown signal to the one-shot 507 when the hydrogen pressure fails to increase at a predetermined minimum rate if it has not already reached the desired pressure.

Figure 5:
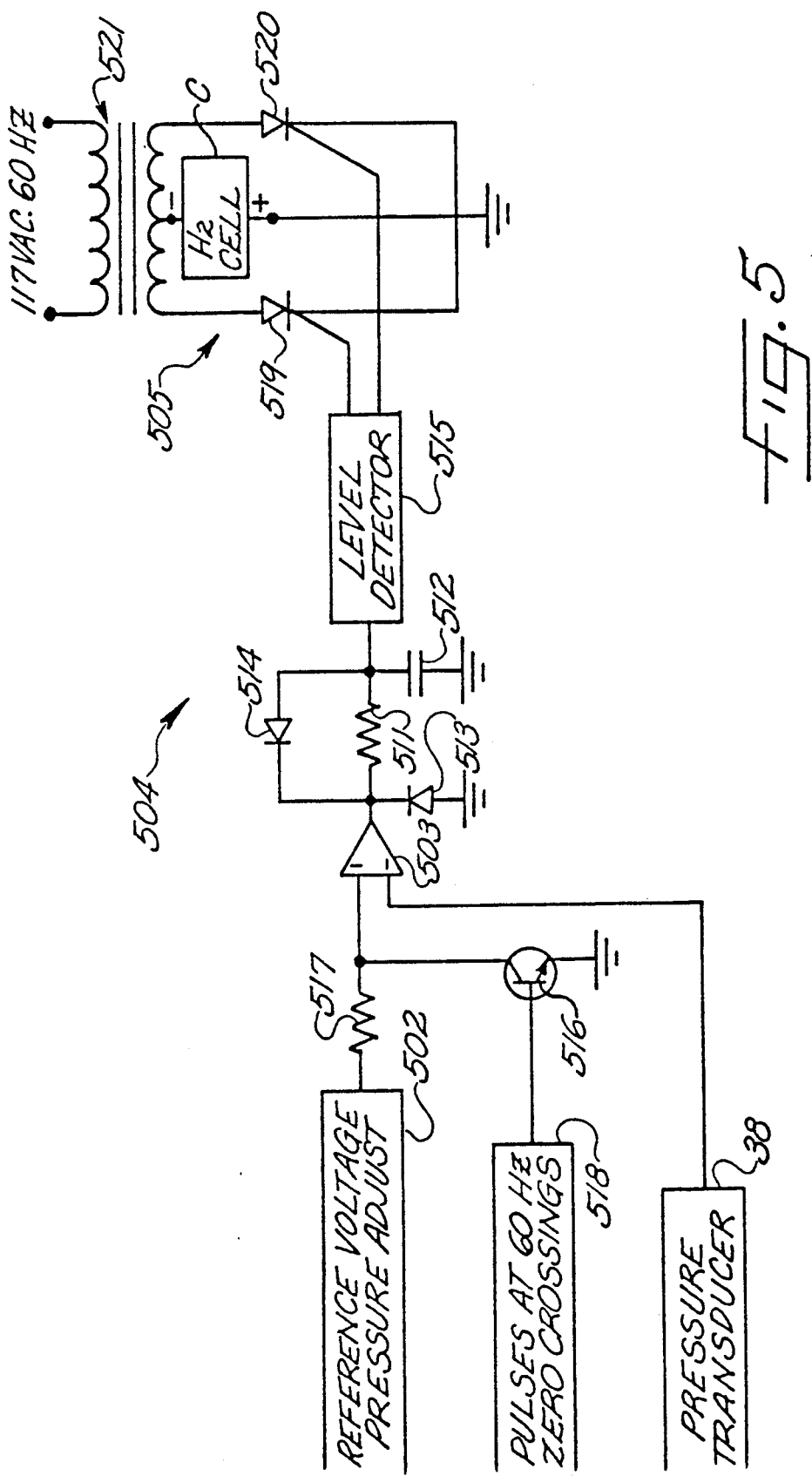
FIG. 5 is a simplified schematic diagram of electrical circuits for controlling current supplied to the hydrogen generator cell to obtain a selected level of hydrogen pressure.

Turning now to FIG. 5, there is shown a simplified diagram of the pulse width modulator 504 and the SCR drive and power control circuits 505. The pulse width modulator 504 includes a resistor 511, a capacitor 512, directional diodes 513 and 514, and a level detector 515. Associated with the pulse width modulator 504 is a transistor 516 and a resistor 517 which are responsive to a source 518 of pulses at the zero crossings in the 60-Hz. or 50-Hz. voltage from the power lines. The transistor 516 applies the pulses to the reference voltage from the potentiometer 502 and the pulses are transferred through the differential amplifier 503 and cause the output of the differential amplifier to go negative and be clamped by diode 513 so that the capacitor 512 is discharged to approximately ground potential through the diode 514 during each zero crossing. The pulses are relatively narrow and therefore during the absence of the pulses the capacitor 512 is charged through resistor 511 up to a value responsive to the difference or between the desired pressure and the measured pressure.

To provide pulses at a 120-Hz. or 100-Hz. rate and at phase angles proportional to the pressure difference, the voltage across the capacitor 512 is applied to a level detector 515 which has a predetermined threshold above ground potential. Pulses from the level detector 515 are applied to the gates of the SCRs 519 and 520 which are wired to the hydrogen generating cell C and a center-tapped secondary of a power transformer 521 in a full-wave rectifier circuit. Since the gating pulses to the SCRs occur at a variable time delay from the zero crossings in the power line voltage, the conduction angle of the SCRs and the current through the cell are adjusted in response to the difference between the desired pressure and the measured pressure.

Figure 6:
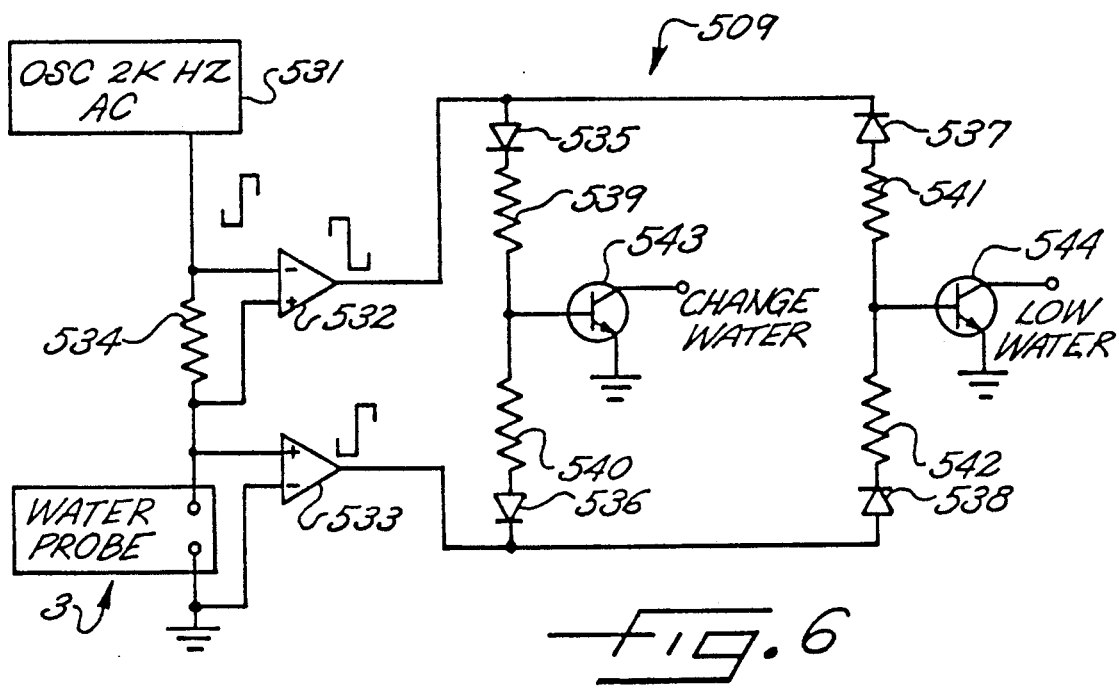
FIG. 6 is a simplified schematic diagram of electrical circuits which are used for detecting excessive water conductivity and lack of water in the hydrogen generator cell.

Turning now to FIG. 6, there is shown a simplified schematic diagram of the water quality and level detector circuits 509 which interrupt the supply of electrical power to the electrolytic cell whenever (1) the water level in the reservoir becomes too low, or (2) impure water is present in the reservoir, e.g., as a result of the addition of tap water rather the deionized distilled water. These circuits include the water probe 3 having a pair of spaced electrodes disposed in the water reservoir 1, an oscillator 531 for energizing the electrodes, a first differential amplifier 532 and a second differential amplifier 533. The first differential amplifier 532 senses the voltage across a resistor 534 which is in series with the water probe 3. The second differential amplifier 533 senses the voltage across the water probe 3. The value of the resistor 534 and the respective gains of the differential amplifiers 532 and 533 are selected so that both of the differential amplifiers provide respective alternating-current output signals that are substantial only when the resistance between the electrodes of the water probe falls within a predetermined range. If the level of the water in the water reservoir 1 falls below the tips of the electrodes in the water probe 3, then an insubstantial amount of current will flow through the resistor 534. In this case only the second differential amplifier 533 will generate a substantial output signal. Conversely, when the resistivity of the water falls below the minimum resistivity, then only the first differential amplifier 532 will generate a substantial output signal.

To indicate the error conditions, the outputs of the two differential amplifiers 532, 533 are wired in a bridge circuit including directional diodes 535, 536, 537, and 538; resistors 539, 540, 541, and 542; and transistors 543 and 544. When both of the amplifiers 532 and 533 generate substantial signals, then the diode bridge is balanced and neither of the transistors 543 and 544 is activated. When the water has a resistivity that is too low, the signal from the first differential amplifier 532 cause the diode 535 and the transistor 543 to conduct, thereby signaling that the water should be changed. When water is absent from between the electrodes of the water probe 3, then the signal from the second differential amplifier 533 causes the diode 538 and the transistor 544 to conduct, thereby signalling that the water level is low.

It will be understood that sensors other than electrodes may be used to sense the "charge water" or "low water" conditions. For example, an optical sensor or a float switch could be used to sense the water level.

Figure 7:
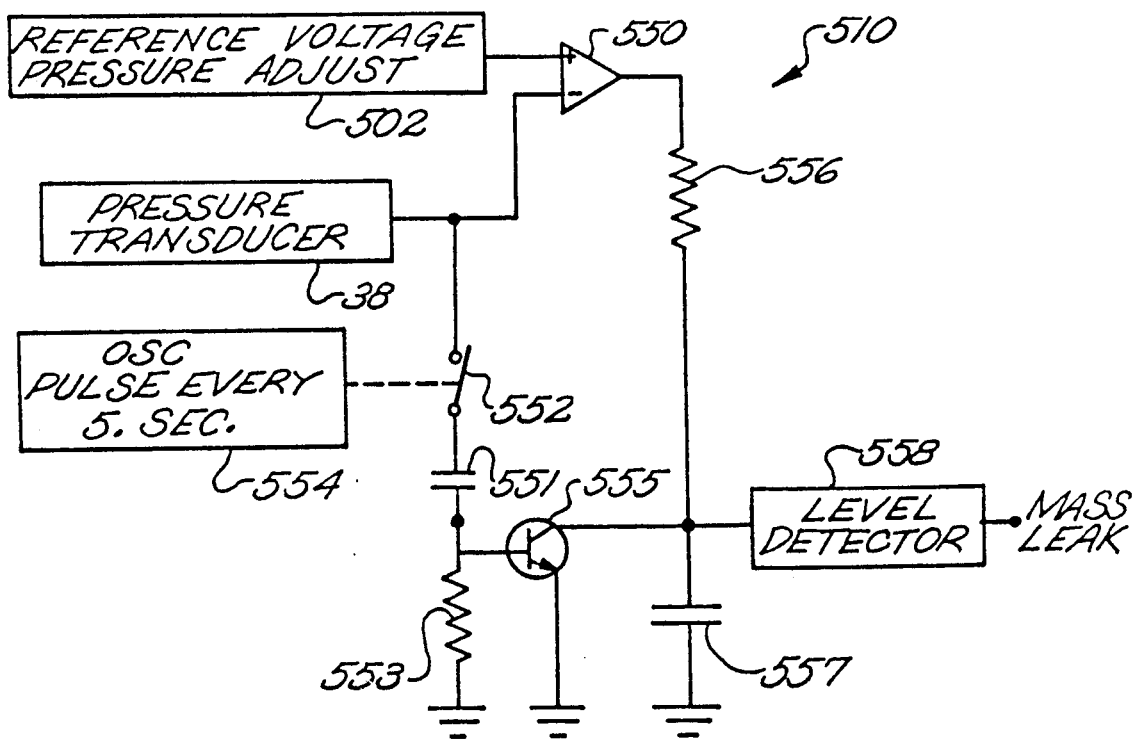
FIG. 7 is a simplified schematic diagram of electrical circuits which are used for detecting a failure of the hydrogen generator to achieve a selected pressure, for example, due to a massive leak in the generator.

Turning now to FIG. 7, there is shown a simplified schematic diagram of the massive leak detector 510. The massive leak detector is operative only when the hydrogen pressure has failed to reach the desired pressure. This condition is detected by a comparator 550 that compares the reference voltage from the pressure adjusting potentiometer 502 to the pressure indicating signal from the pressure transducer 38. The differential amplifier 550 is matched with the differential amplifier 503 of FIG. 5 so that the output signal of the amplifier 550 will be at a positive voltage only when the hydrogen generating cell is energized and the measured pressure has failed to reach the desired pressure. Under these conditions, the hydrogen generating cell should generate a sufficient amount of hydrogen gas to increase the pressure at a substantial rate until the measured pressure reaches the desired pressure.

To determine whether the measured pressure is substantially increasing, the massive leak detector 510 includes a capacitor 551 which is periodically connected by a controlled switch 552 to the output voltage of the pressure transducer 38. The switch 552 is pulsed closed at the prescribed intervals. The increase in the pressure-indicating voltage over the prescribed interval appears as a voltage pulse across a resistor 553 in series with the capacitor 551. If the hydrogen generator is operating properly, then the voltage pulse turns on a transistor 555.

A massive leak is detected when the transistor 555 fails to be turned on within a prescribed time interval whenever the measured pressure is below the desired pressure. For this purpose the output of the comparator 550 charges a capacitor 557 through a resistor 556, and the capacitor 557 is connected to the collector of the transistor 555 to discharge the capacitor when the transistor turns on. The voltage across the capacitor 557 is fed to a shutdown detector that has a predetermined threshold voltage to which the capacitor 557 is charged by the comparator 550 unless the transistor 555 turns on.

When a massive leak is present, the measured pressure will fail to reach the desired pressure and hence the capacitor 557 will be charged. Also, the measured pressure will fail to increase at a rate sufficient to turn the transistor 555 on to discharge the capacitor 557. Therefore, the shutdown detector 558 will assert a signal indicating the presence of the massive leak and fire the one shot 507 (FIG. 4) permanently.

Figure 8:
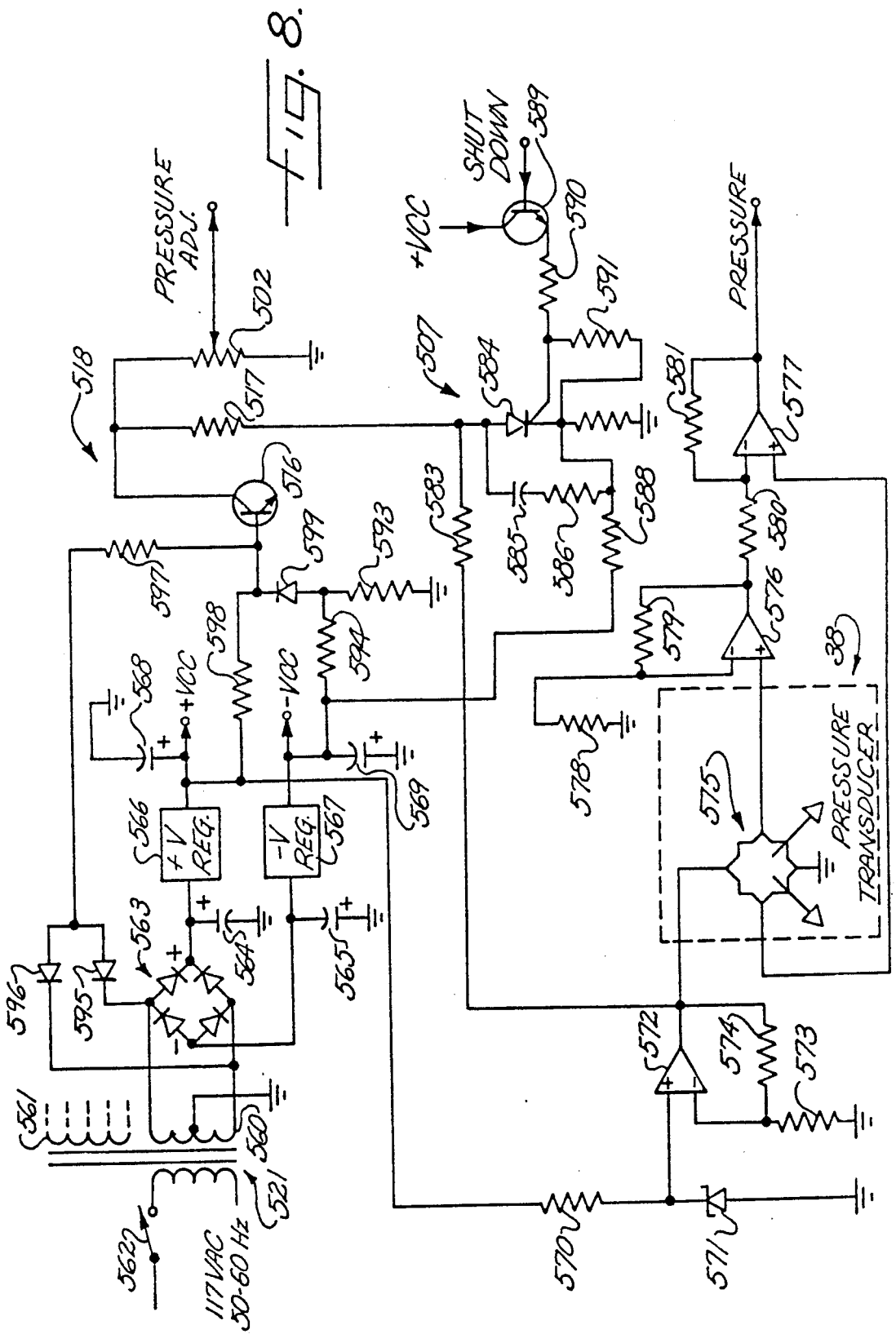
FIG. 8 is a detailed schematic diagram of circuits for indicating a selected hydrogen pressure, sensing the actual hydrogen pressure, and shutting down the generator under certain abnormal conditions.

Turning now to FIG. 8, there is shown a detailed schematic diagram of the preferred circuits associated with the pressure-adjusting potentiometer 502, the one-shot 507 and the pressure transducer 38. The electronic circuits are powered by a secondary 560 of the power transformer 521 that is separate from the secondary 561 that supplies current to the hydrogen-generating cell C. The primary of the power transformer 521 is connected to the power lines through a switch 562.

To provide positive (+VCC) and negative (−VCC) supply voltages for the electronic circuits, the secondary coil 560 has a grounded center tap and is connected to a bridge rectifier 563. The positive and negative outputs of the bridge rectifier 563 are shunted to ground through respective electrolytic filter capacitors 564 and 565. In addition, the positive and negative output voltages of the bridge rectifier 563 are regulated by respective positive and negative voltage regulators 566 and 567. The outputs +VCC and −VCC are shunted to ground by respective electrolytic capacitors 568 and 569.

To provide a voltage reference for the pressure transducer 38, the output of the positive voltage regulator 566 is connected through a voltage-dropping resistor 570 to a zener diode 571. The voltage across the zener diode 571 is buffered by an amplifier 572 having its gain set by resistors 573 and 574.

To measure the hydrogen gas pressure, the pressure transducer 38 has a balanced resistive strain gage bridge 575, and the difference voltage across the bridge is amplified by a pair of differential amplifiers 576 and 577 that are wired so as not to amplify common mode signals. The amplifiers work in connection with feedback resistors 578, 579, 580, and 581.

The pressure-adjusting potentiometer 502 is connected through resistors 517 and 583 to the reference voltage from the amplifier 572. The voltage reference, however, is removed from the pressure-adjusting potentiometer 502 when the one-shot 507 is triggered by a shut-down signal. The bistable element of the one-shot is an SCR 584 having a snubbing capacitor 585 and resistor 586. The cathode of the SCR is biased by resistors 587 and 588 to a negative voltage between ground and −VCC. To trigger the SCR, a transistor 589 receives the shut-down signal and is wired as an emitter follower to drive the gate of the SCR through a current-limiting resistor 590 and a shunt resistor 591.

The voltage across the pressure-adjusting potentiometer 502 is also interrupted periodically by pulses at the zero crossings in the power line voltage. The pulse generator circuits 518 include a transistor 516 having its emitter held at a negative voltage by a resistor 593 connected to ground and a resistor 594 connected to −VCC. To turn the transistor 516 on and off at the zero crossings of the power line voltage, the transistor is normally turned off by a negative voltage from either one of two directional diodes 595 and 596 connected to the AC inputs of the bridge rectifier 563. The base of the transistor 516 is connected to these diodes 595 and 596 through a resistor 597, and is also connected to the positive supply +VCC through a resistor 598, and the values of the resistors 597 and 598 are selected so that the transistor 516 is turned on for a short time during each zero crossing. The base and the emitter of the transistor 516 are shunted by a directional diode 599 to prevent the base of the transistor from being reversed biased.

Figure 9:
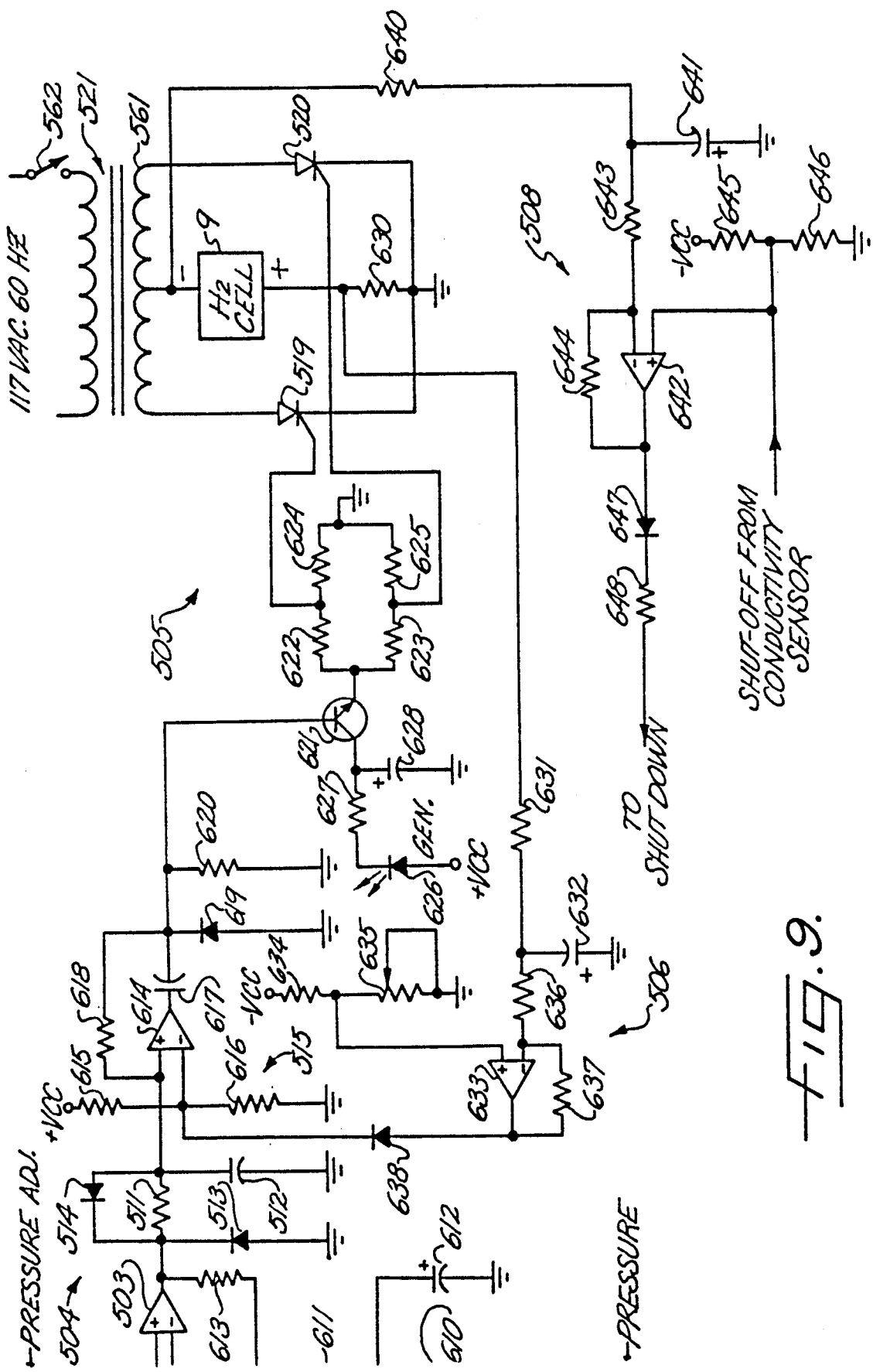
FIG. 9 is a detailed schematic diagram of the circuits for controlling the current supplied to the hydrogen generator cell to obtain a selected level of hydrogen pressure.

Turning now to FIG. 9 there is shown a detailed schematic diagram of the differential amplifier 503, the pulse width modulator 504, the SCR drive and power control circuits 505, the maximum cell current feedback circuits 506, and the cell over voltage detector 508. The pressure-indicating signal from the pressure transducer (38 in FIG. 8) is applied to the differential amplifier 503 through a low-pass filter including series resistors 610 and 611, and a shunt capacitor 612. The gain of the differential amplifier 503 is set by a feedback resistor 613. The level detector 515 includes a differential amplifier 614 having a threshold set by a voltage divider including resistors 615 and 616. To generate a positive pulse when the threshold is exceeded, the output of the differential amplifier 614 is connected to a capacitor 617 which in turn is connected to a positive feedback resistor 618. The capacitor 617 is also shunted to ground by a clamping diode 619 and a resistor 620 so that positive pulses are generated across the resistor 620.

To drive the gates of the SCRs 519 and 520, the pulses across the resistor 620 are applied to the base of a transistor 621 wired in an emitter-follower configuration. The emitter of the transistor 621 is connected to respective series resistors 622, 623 and shunt resistors 624 and 625 which are in turn connected to the gates of the SCRs.

In order to indicate that the SCRs are being turned on, the collector of the transistor 621 is fed by current through a light-emitting diode 626 having its anode connected to +VCC. A capacitor 628 supplies current for pulses to the SCR gates, and the capacitor 628 and a resistor 627 average these high current pulses to approximately d-c. for the light-emitting diode 626.

To limit the current through the silicon controlled rectifiers to a safe maximum value, the current is sensed by a series resistor 630 having a relatively low resistance. The current through this resistance creates a relatively small negative voltage which is low-pass filtered by a resistor 631 and an electrolytic capacitor 632.

The maximum cell current detector 506 further includes a differential amplifier 633 which compares the voltage across the capacitor 632 to a reference voltage provided by a voltage divider including a resistor 634 and a variable resistor 635. The gain of the amplifier 633 is set by a series resistor 636 and a negative feedback resistor 637. The output of the amplifier 633 is fed back to the threshold-detecting amplifier 614 through a directional diode 638. When the current through the hydrogen-generating cell C is less than a predetermined maximum value set by the variable resistors 635, then the diode 638 will be reverse biased, and the amplifier 633 will have a negligible effect on the threshold-detecting amplifier 614. However, when the current through the hydrogen-generating cell C exceeds the predetermined maximum limit, then the diode 638 is forward biased and the amplifier 633 will inhibit the threshold-detecting amplifier 614. Therefore, when the maximum current limit is exceeded, gate pulses will be applied at maximum phase to hold preset maximum current levels through the hydrogen-generating cell C.

The over voltage detector 508 shuts off the hydrogen-generating cell entirely when the cell voltage exceeds a certain maximum limit. The cell voltage is low-pass filtered by a resistor 640 and an electrolytic capacitor 641. The cell over voltage detector 508 further includes a differential amplifier 642 having a gain set by a series resistor 643 and a negative feedback resistor 644. The desired voltage threshold is provided by a resistor voltage divider including resistors 645 and 646.

The amplifier 642 is connected to the transistor 589 of the one-shot circuit 507 of FIG. 8, through a directional diode 647 and a resistor 648. Therefore, when the cell voltage exceeds the threshold value, the amplifier 642 forward biases the diode 647, and current flows through the diode to turn on the transistor 589 in FIG. 8 to trigger the one-shot (507 in FIG. 8) and shut off the current to the hydrogen-generating cell C.

Figure 10:
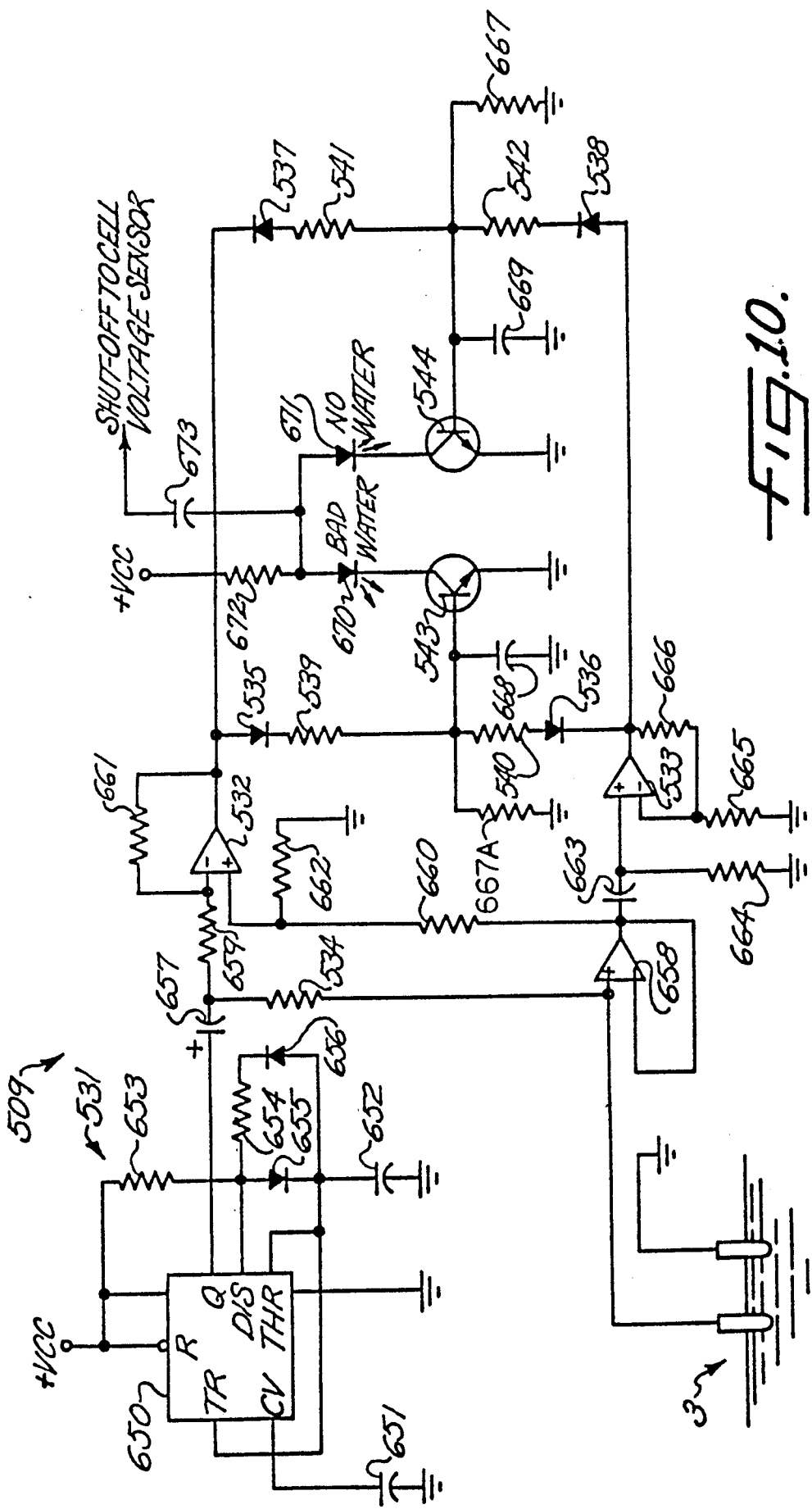
FIG. 10 is a detailed schematic diagram of the circuits for detecting excessive water conductivity and lack of water in the hydrogen generator.

Turning now to FIG. 10, there is shown a detailed schematic diagram of the water quality and level detector 509. The oscillator 531 includes an integrated circuit 650 that works in connection with capacitors 651, 652, resistors 653, 654 and directional diodes 655 and 656. The signal from the integrated circuit 650 is coupled through a tantalum capacitor 657 to the current-sensing resistor 534. Due to the rather high resistance being sensed, the signal across the water probe 3 is buffered by a follower amplifier 658 before being applied to the amplifiers 532 and 533. The first amplifier 532 works in connection with resistors 659, 660, 661 and 662, and the second amplifier 533 works in connection with a coupling capacitor 663 and resistors 664, 665, and 666.

The outputs of the amplifiers 532, 533 are connected to the diode bridge including the diodes 535 to 538 and the resistors 539 to 542. The midpoints of the diode bridqe are connected to the transistors 543 and 544. To reject noise, the midpoints of the bridge are shunted to ground by resistors 667, 667a and capacitors 668 and 669.

To indicate the "charge water" or "no water" error conditions, the collectors of the transistors 543 and 544 are connected to respective light-emitting diodes 670 and 671 which share a common current-limiting resistor 672. To shut off the current to the hydrogen-generating cell (C in FIG. 9) when either the "change water" or "no water" error is detected, the voltage across the current-limiting resistor 672 is coupled through a capacitor 673 to the voltage reference in the cell over voltage detector 508 of FIG. 9. This is the most convenient method of connecting the water quality detector to the one-shot 507 of FIG. 8.

Figure 11:
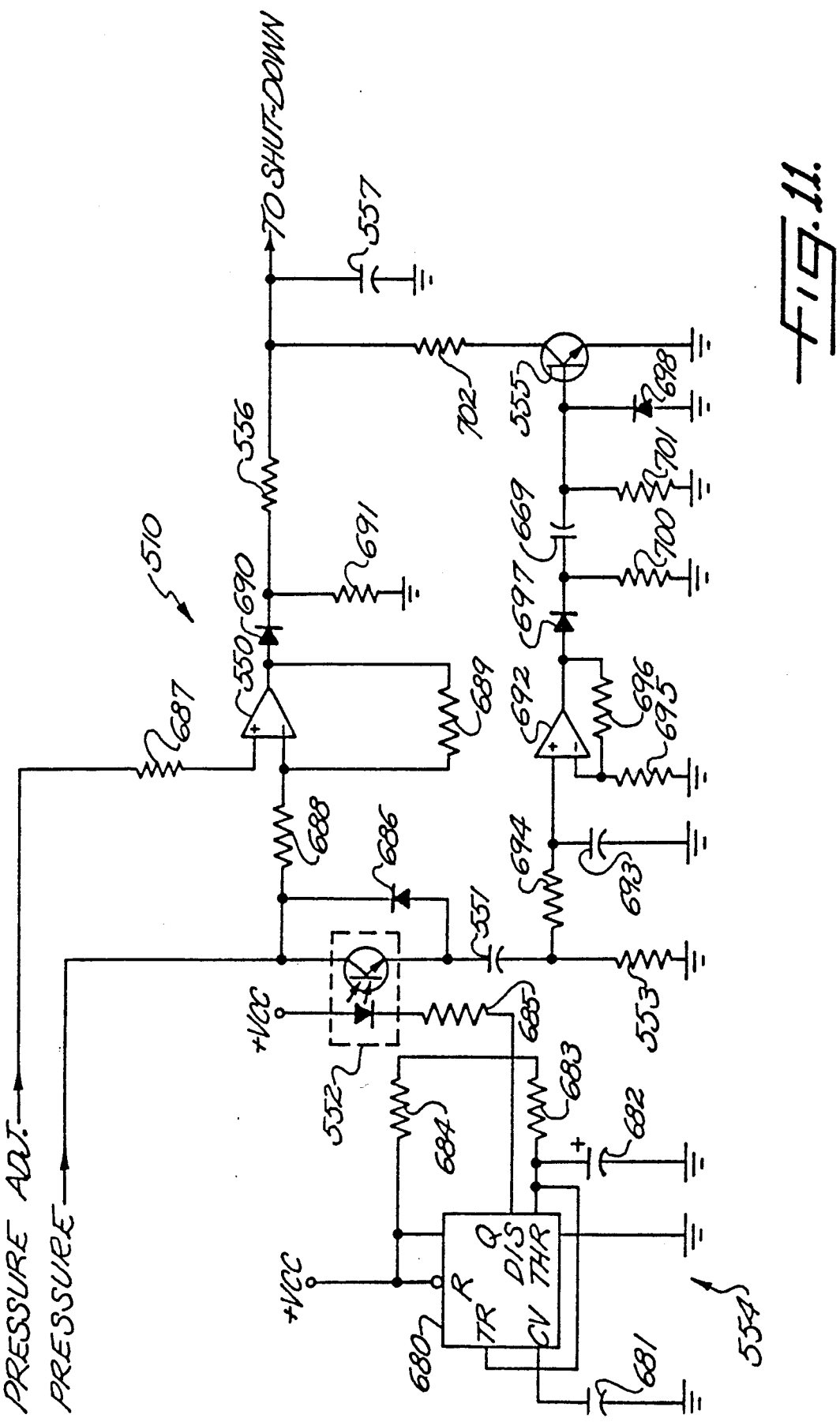
FIG. 11 is a detailed schematic diagram of the circuits for detecting the failure of the hydrogen generator to achieve a selected pressure.

Turning now to FIG. 11 there is shown a detailed schematic diagram of the massive leak detector 510. The pulse generator 554 includes an integrated circuit 680 working in connection with capacitors 681, 682 and resistors 683 and 684. The controlled switch 552 is preferably an optical coupler. The light-emitting diode of the optical coupler 552 is connected to the output of the integrated circuit 680 through a current-limiting resistor 685. Preferably a directional diode 686 shunts the controlled switch 552 to ensure that the phototransistor of the switch is not reverse biased.

The differential amplifier 550 works in connection with resistors 687, 688 and 689. The amplifier 550 charges the capacitor 557 through a directional diode 690 and the resistor 556. When the output voltage of the amplifier 550 is negative, the capacitor 557 discharges through the resistor 556 and a shunt resistor 691.

The capacitor 551 should have low leakage and is preferably a polycarbonate capacitor.

As shown in FIG. 11, it is preferable to provide an amplifier 692 between the resistor 553 and the transistor 555. The amplifier 692 works in connection with a capacitor 693 and resistors 694, 695 and 696. The output of the amplifier 692 is coupled to the transistor 555 through a network including directional diodes 697 and 698, a capacitor 699 and resistors 700 and 701.

When the measured pressure has been substantially increasing and the electronic switch 552 closes, a relatively small voltage pulse is generated across the current sensing resistor 553 but this voltage pulse is amplified by the amplifier 692 to have a sufficient amplitude to turn on the transistor 555. The transistor 555 will therefore discharge the capacitor 557. The collector of the transistor 555 is connected to the capacitor 557 through a current limiting resistor 702. If, however, the pressure is not substantially increasing and the amplifier 550 has a positive output voltage indicating that the desired pressure has not been reached, then the capacitor 557 will charge up to the threshold of the one-shot (507 of FIG. 8) to shut down the hydrogen-generating cell (C in FIG. 9).

As one feature of the present invention, water is recycled from the hydrogen-water separator to the anode side of the electrolytic cell by returning water from the separator to the water reservoir. This feature permits water to be supplied continuously from the reservoir to the anode chamber, without the need to periodically reverse the movement of water molecules through the solid electrolyte and the attendant danger of drying out and irreversibly damaging the electrolyte.

We claim:

1. Apparatus for generating hydrogen by the electrolytic dissociation of water, said apparatus comprising:
   an electrolytic cell having a cathode and an anode separated by a solid-electrolyte whereby the cathode is on one side of the solid electrolyte and the anode is on the other side of the solid electrolyte,
   an electrical power supply connected to said electrolytic cell for applying a voltage across said cathode and anode,
   a water reservoir connected to said electrolytic cell for supplying water to said electrolytic cell on the same side of the solid electrolyte on which said anode is located,
   a hydrogen-water separator connected to said electrolytic cell for receiving hydrogen and water from said electrolytic cell on the same side of the solid electrolyte on which said cathode is located, and separating the hydrogen from the water,
   a pressure relief valve included in said hydrogen-water separator for discharging hydrogen from said separator to the atmosphere in response to an increase in the pressure of said hydrogen in said separator beyond a predetermined level, and
   a water return line connecting said hydrogen-water separator to said water reservoir for returning water from said hydrogen-water separator to said water reservoir whereby said water is recycled to the anode side of said electrolytic cell.

2. The apparatus of claim 1 which includes control means in said hydrogen-water separator for opening and closing said water return line in accordance with the water level in said separator.

3. The apparatus of claim 1 which includes a hydrogen outlet in said separator, and a float valve in said hydrogen-water separator for closing said hydrogen outlet in response to an increase in the water level in said separator to the level of said hydrogen outlet, so as to prevent water from entering said hydrogen outlet in the event of a malfunction of said control means.

4. The apparatus of claim 1 which includes a hydrogen outlet in said separator, and valve means associated with said hydrogen outlet for closing said outlet in response to an increase in the rate of low of hydrogen through said hydrogen outlet beyond a predetermined level.

5. Apparatus for generating hydrogen by the electrolytic dissociation of water, said apparatus comprising:
an electrolytic cell having a cathode and an anode separated by a solid-electrolyte whereby the cathode is on one side of the solid electrolyte and the anode is on the other side of the solid electrolyte,
an electrical power supply connected to said electrolytic cell for applying a voltage across said cathode and anode and thereby supplying electrical power to said cell,
a water reservoir connected to said electrolytic cell for supplying water to said electrolytic cell on the same side of the solid electrolyte on which said anode is located,
a hydrogen-water separator connected to said electrolytic cell for receiving hydrogen and water from said electrolytic cell on the same side of the solid electrolyte on which said cathode is located, and separating the hydrogen from the water,
sensing means in said water reservoir for producing an electrical signal in response to a predetermined change in the electrical conductivity of the water in said reservoir, and
electrical control means responsive to the electrical signal from said sensing means for automatically interrupting the supply of electrical power to said electrolytic cell.

6. Apparatus for generating hydrogen by the electrolytic dissociation of water, said apparatus comprising:
an electrolytic cell having a cathode and an anode separated by a solid-electrolyte whereby the cathode is on one side of the solid electrolyte and the anode is on the other side of the solid electrolyte,
an electrical power supply connected to said electrolytic cell for applying a voltage across said cathode and anode and thereby supplying electrical power to said cell,
a water reservoir connected to said electrolytic cell for supplying water to said electrolytic cell on the same side of the solid electrolyte on which said anode is located,
a hydrogen-water separator connected to said electrolytic cell for receiving hydrogen and water from said electrolytic cell on the same side of the solid electrolyte on which said cathode is located, and separating the hydrogen from the water,
a hydrogen output line for removing the hydrogen from said separator,
sensing means in said hydrogen output line for producing an electrical signal representing the pressure of said hydrogen in said hydrogen output line,
a reference signal source for generating an electrical signal representing a desired gas pressure in said hydrogen output line, and
control means response to the electrical signals from said sensing means and said reference signal source for interrupting the supply of electrical power to said electrolytic cell when (1) said pressure of said hydrogen in said hydrogen output line is less than said desired gas pressure and (2) said actual gas pressure is increasing at a rate less than a predetermined minimum rate.

7. Apparatus for generating hydrogen by the electrolytic dissociation of water, said apparatus comprising:
an electrolytic cell having a cathode and an anode separated by a solid-electrolyte whereby the cathode is on one side of the solid electrolyte and the anode is on the other side of the solid electrolyte said solid electrolyte comprising a solid polymer ion exchange membrane which is subject to delamination in the event of a sudden reduction in pressure,
an electrical power supply connected to said electrolytic cell for applying a voltage across said cathode and anode,
a water reservoir connected to said electrolytic cell for supplying water to the same side of the solid electrolyte on which said anode is located,
a hydrogen-water separator connected to said electrolytic cell for receiving hydrogen and water from said electrolytic cell on the same side of the solid electrolyte on which said cathode is located, and separating the hydrogen from the water, said separator including a hydrogen outlet,
a hydrogen output line for receiving the hydrogen from said hydrogen outlet in said separator, and
excess flow valve means associated with said hydrogen outlet in said separator for preventing delamination of said ion exchange membrane by closing said outlet in response to an increase in the hydrogen flow rate beyond a predetermined level.

8. The apparatus of claim 7 wherein said valve means comprises a ball valve connected to said hydrogen outlet and containing a ball which rises in proportion to the flow rate of the hydrogen gas passing through said outlet, and a seal for receiving the ball and blocking said hydrogen outlet when the ball rises to a predetermined elevation corresponding to a predetermined hydrogen flow rate.

* * * * *